US007164348B2

(12) United States Patent
Smith

(10) Patent No.: US 7,164,348 B2
(45) Date of Patent: Jan. 16, 2007

(54) INCONSPICUOUS TACTILE NOTIFICATION FOR SPEAKING ENGAGEMENTS

(76) Inventor: Eric Smith, 305 N. 1130 E., Lindon, UT (US) 84042

( * ) Notice: Subject to any disclaimer, the term of this patent is extended or adjusted under 35 U.S.C. 154(b) by 277 days.

(21) Appl. No.: 10/307,170

(22) Filed: Nov. 27, 2002

(65) Prior Publication Data

US 2004/0100367 A1 May 27, 2004

(51) Int. Cl.
*H04B 3/36* (2006.01)

(52) U.S. Cl. ............................ 340/407.1; 340/309.16; 340/539.1; 340/573.1; 340/965; 340/7.6

(58) Field of Classification Search ............. 340/407.1, 340/825.46, 825.44, 311.1, 825.48, 825.19, 340/309.16, 539.1, 573.1, 965, 311.2, 309.7, 340/7.6; 455/350, 351, 567, 38.2, 31.1, 31.2; 318/162, 114; 310/81, 82

See application file for complete search history.

(56) References Cited

U.S. PATENT DOCUMENTS 5,272,475 A * 12/1993 Eaton et al. ............... 340/7.32
5,568,963 A * 10/1996 Bennett et al. ............. 353/122
5,835,006 A * 11/1998 Michalak et al. ........ 340/407.1
5,890,073 A * 3/1999 Fukawa ...................... 455/557
6,018,671 A * 1/2000 Bremer ....................... 455/567
6,724,298 B1 * 4/2004 Smith ...................... 340/407.1

OTHER PUBLICATIONS

Christopher S. Frings, Interuptions in Meetings From Cell Phones and Beepers, Medical Laboratory Observer, Nov. 2000 issue, Nelson Publishing, Nokomis, FL.

* cited by examiner

*Primary Examiner*—Hung Nguyen

(57) ABSTRACT

With the increasing popularity of multimedia presentations at business meetings and conferences, presenters often wish to be free to move about during their presentation. Moderators at a presentation or conference can use this invention to communicate with the presenters. Podium lights, buzzers, or other obtrusive signals are becoming less and less effective means of signaling during presentations. For this reason, the present invention employs remote controlled tactile notification rather than sight or sound. The moderator might inform the presenter that the allotted time has expired or numerous other messages may be signaled. A predetermined message or code is sent to the presenter by stimulating the presenter's sense of touch.

15 Claims, 4 Drawing Sheets

INCONSPICUOUS TACTILE NOTIFICATION FOR SPEAKING ENGAGEMENTS

CROSS REFERENCE RELATED TO APPLICATIONS

Not applicable

STATEMENT REGARDING FEDERALLY SPONSORED RESEARCH OR DEVELOPMENT

Not Applicable

BACKGROUND OF THE INVENTION

Speaking engagements have become commonplace in fields of business, entertainment, and others. The moderator at a presentation or conference must often communicate with presenters. It is most common that a moderator must inform the presenter that the allotted time has expired, but there are numerous other reasons why the moderator, director, or other organizer of a performance or presentation may wish to signal someone on the stage, platform, or otherwise before an audience.

A beeper or buzzer connected to a switch or a timer has often been used to signal a presenter that the allotted time has expired. Small headphones or earplugs capable of receiving radio transmissions were fitted to commentators so that last minute information and instructions might be given during the show. In situations where less obtrusive signaling was desired, a small light device was attached to a podium so that a moderator at a speaking engagement could send a signal to the presenter. Sometimes the moderators even made hand gestures like pointing to the wrist or a clock on the wall. In other situations, the moderator simply vocalized to the presenter the information required, tapped the speaker or performer on the shoulder, or used even a most comical and intrusive technique: a long cane with a crooked end popped out from somewhere behind the curtain, hooked around the neck of a performer and dragged him off the stage.

With the increasing popularity of multimedia presentations at business meetings and conferences, presenters often wish to be free to move about during their presentation. They may wish to mingle amongst the audience or step over to a screen or chart they are displaying. Podium lights or other visual signals are becoming less and less effective means of signaling during presentations.

BRIEF SUMMARY OF THE INVENTION

There has been a long felt and previously unfilled need in the industry for a less conspicuous method for communicating with the speaker that is sure to get the speakers attention no matter where their movements may take them. For this reason, the present invention employs remote controlled tactile notification rather than sight or sound as used in the prior art.

Human tactile notification can be anything that creates a human touch response. In one embodiment, the invention uses the remote controlled pulse of a piston. In another embodiment, it uses temperature changes. In yet another, the invention generates a static electrical potential sufficient to deliver a small non-lethal shock to a person presenting. Numerous other embodiments for tactile notification are possible, but the preferred embodiment for the invention employs vibration as the means for notification.

Cell phones and pagers are excellent examples vibrating devices used to quietly replace the normal ringer which can also be disruptive during movies, business meetings, conferences and the like. Anyone whose child has owned one of the numerous versions of vibrating toys such as a “Tickle” doll has experienced this technology. These vibrating toys use a vibration system designed to simulate body-shaking laughter. The preferred embodiment of the present invention uses a similar vibration system that works on a smaller scale.

Minor surgery on a shaking laughter toy reveals a control unit. Inside the control unit is a small DC motor that drives a gear system. Attached to the gear is a small off-centered weight mounted on the gear. When the motor spins the mounted gear weight causes a strong vibration. In the shaking laughter toy, a switch found on the control unit activates the vibration. In a remote control vibrator the vibrating device can be activated from a distance.

There are various examples of remote controlled vibrating devices, one type is found in the sex toy section of a sexually erotic products store or catalog. Strangely enough, these devices are constructed similar to the vibrating shaking laughter children’s toys, but are smaller and can be fitted in close proximity to the sexual organs of its wearer. These devices have been designed so that the person wearing the device or a sexual partner can activate the vibrations remotely causing sexual stimulation. Unlike sex toys or cell phones, in the present invention, the type of vibration used must occur at the proper time to become a notification to a speaker or performer.

DETAILED DESCRIPTION OF THE INVENTION

In one embodiment of the present invention, the presenter of a multimedia presentation is simply fitted with a pager device or cell phone set to vibrate and the number of that pager or cell phone is dialed at the proper time to unobtrusively communicate a predetermined message from the moderator to the speaker. In this particular embodiment, the message or communication sought for delivery from the moderator to the speaker, unlike normal cell-phone or pager, is not displayed on the digital readout, but it is a predetermined message such as notifying the speaker that the allotted time has expired.

In another embodiment of the present invention, the presenter is fitted with one of those remote controlled sexual vibrating devices (albeit, not worn over the sex organs of the speaker) and the moderator holds the remote control, thereby having the ability to unobtrusively and remotely signal the speaker. In this particular embodiment, the vibration is a tactile signal and not used as a sexual arousal.

In another embodiment of the present invention, the presenter carries a microphone attached to a microphone cord. The microphone in hand can vibrate at timed intervals or can remotely be made to vibrate when the moderator wishes.

In yet another embodiment of the present invention a wireless microphone sending unit, wireless microphone, or microphone clip is fitted with a vibrating unit that can vibrate at a specific interval or made to vibrate when the moderator wishes.

The very important predetermined message from the moderator to the speaker is an extra step not included in the sex toy, cell phone, or pager as prior art. The predetermined message can be as simple as letting the speaker know before hand that when the vibration is felt, the allotted time is up. Or, it can be as complicated as a secret encrypted message given by Morse code. Unlike the cell-phone, pager, or sex toy, the predetermined message is the actual communiqué, not the vibration itself.

In the preferred embodiment of the present invention, the vibrating device is mounted, attached, or contained within a wireless microphone-sending unit. The microphone-sending unit is then held or worn by the speaker or performer and the moderator can send signals to the speaker by a remote controlled device mounted in the wireless microphone-receiving unit or it can be set to vibrate at certain intervals as controlled by a timer.

BRIEF DESCRIPTION OF THE SEVERAL VIEWS OF THE DRAWING

A typical wireless microphone set up consists of a wireless sending unit capable of transmitting the signals from a microphone to a wireless receiving unit attached to a PA (Public Address) system.

In the typical wireless microphone system, there is only one-way communication where the signals from the microphone travel down a coaxial wire to the signal-sending unit, which transmits the signal to the wireless signal-receiving unit. In this preferred embodiment, the typical setup for a wireless microphone exists, but here with the additional capability of transmitting back a completely different and separate signal to the microphone signal-sending unit.

Figure 1:
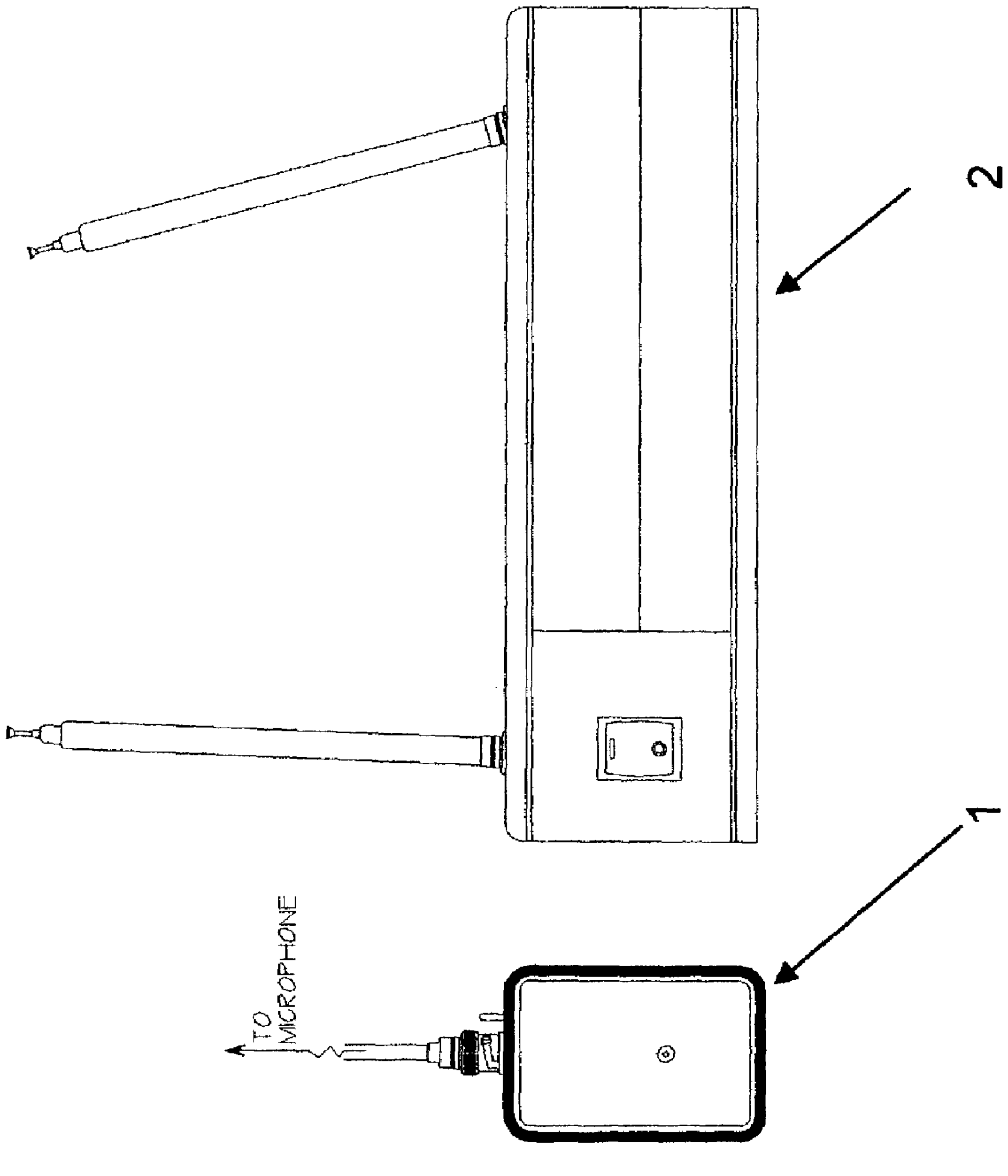
FIG. 1 shows a typical wireless microphone system, which is common in the prior art. The wireless microphone signal-sending unit (1) is usually worn by the presenter or performer. The moderator or audio technician sets up the wireless microphone signal-receiving unit (2) to be connected to the input of an amplifier or other PA system.
Figure 2:
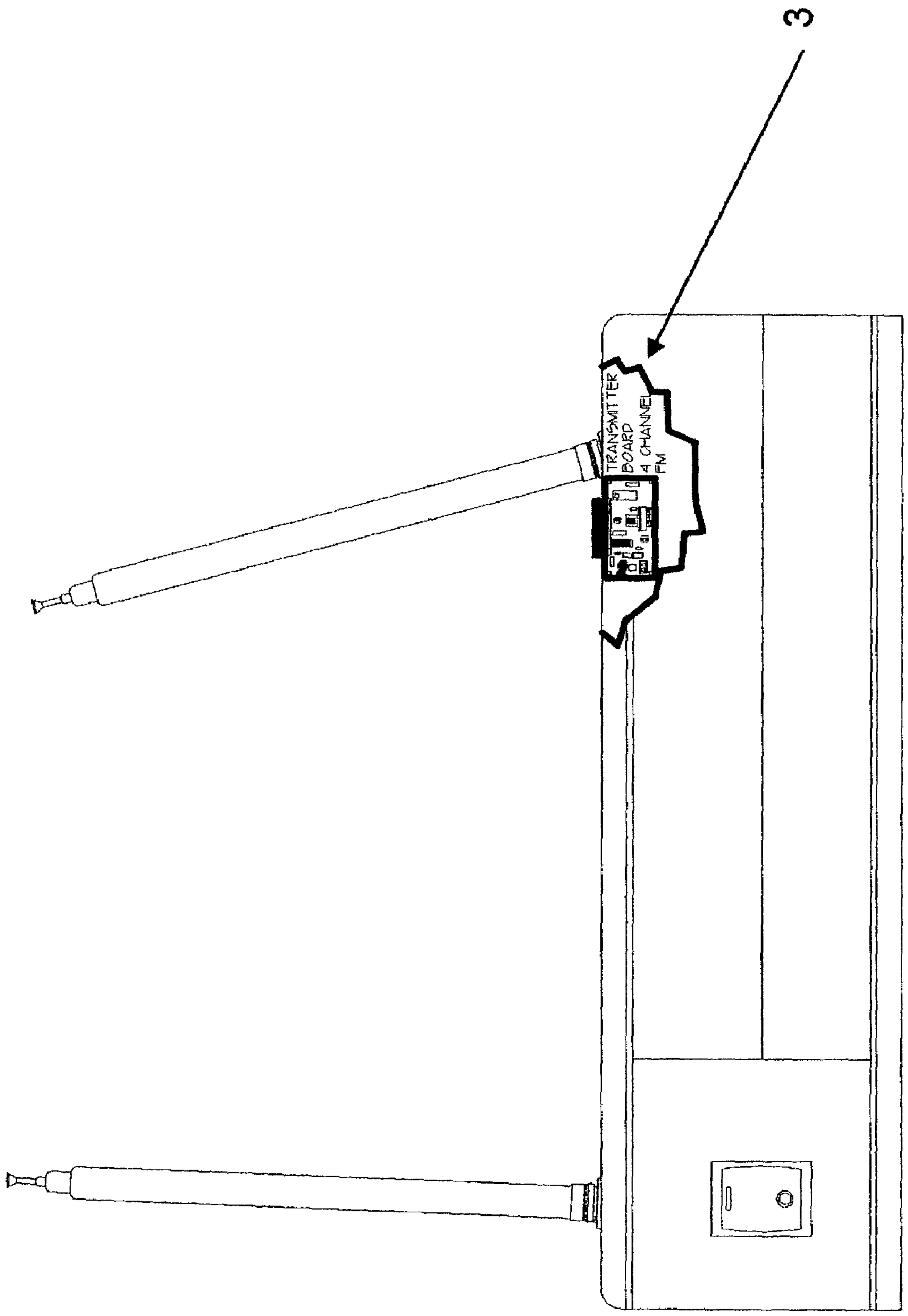

The signals sent back to the microphone signal-sending unit are switch-activating signals for the purpose of activating a vibrator notification system, which can be controlled by the moderator. FIG. 2 shows a "cut-away" of the wireless microphone signal-receiving unit, which has been fitted with the additional transmitter board (3) for sending the vibrator activating signals back to the microphone signal-sending unit.

Figure 3:
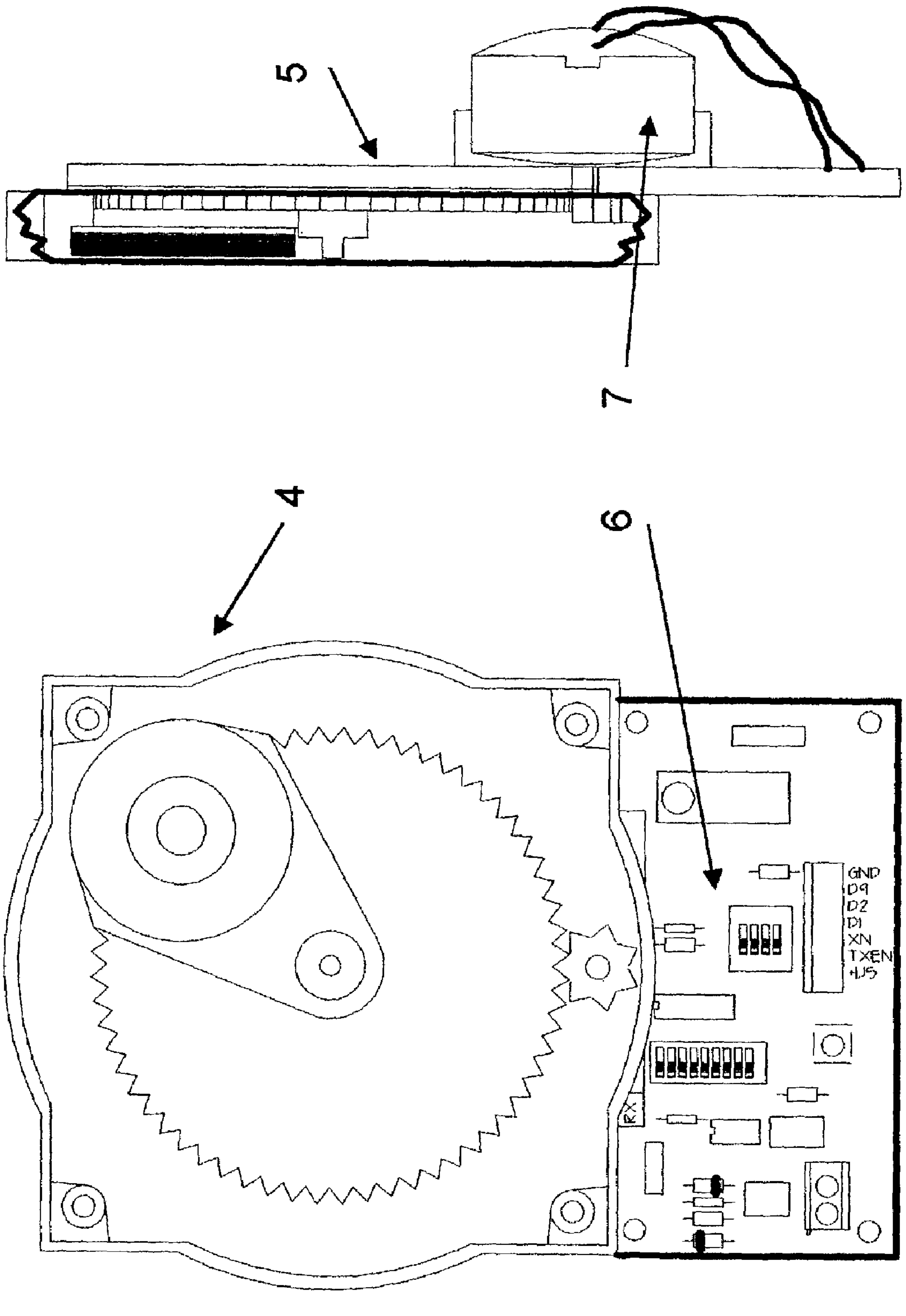
Figure 4:
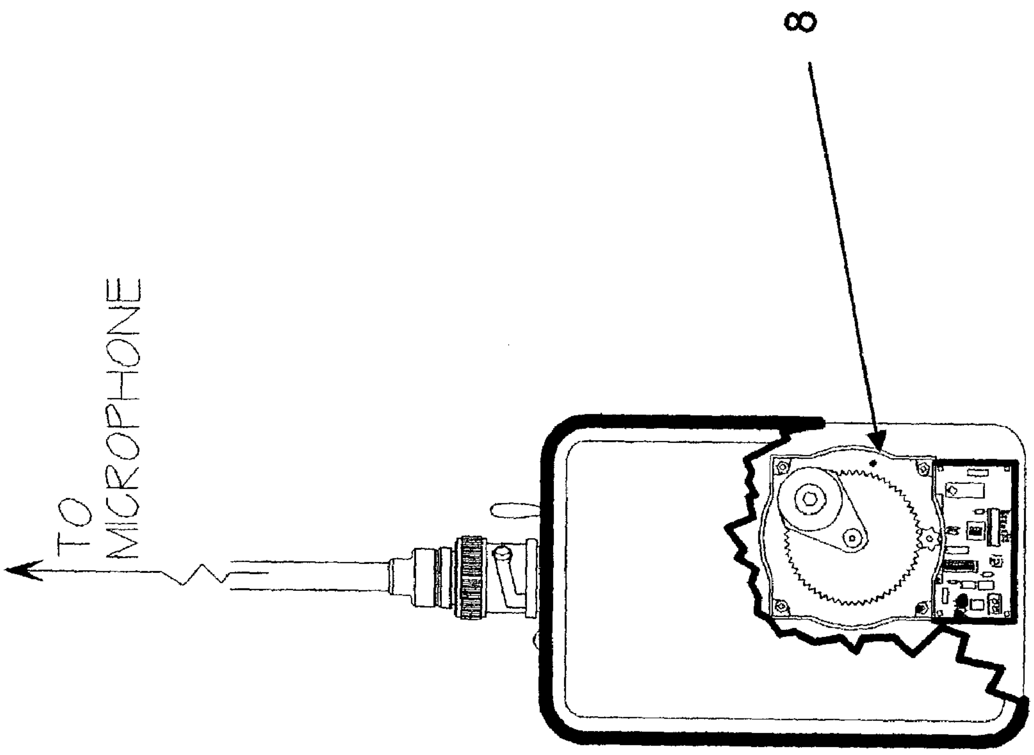

FIG. 3 shows a top and right side "cut-away" view of the slim-line design remote controlled vibrating unit, which is small enough to be mounted inside the microphone signal-sending unit. The off center mounted weight (4) causes the vibrations when the gear (5) turns as a result of the micro-motor (7) spinning. A separate remote signal receiving board (6) mounted on the vibrating unit activates the micro-motor (7). The slim-line remote controlled vibrating unit is mounted (8) inside the microphone signal-sending unit as shown in FIG. 4.

I claim:

1. A method of sending a presentation management predetermined message to a person who is presenting to an audience comprising mechanical tactile notification undetectable by said audience through attaching a vibrator to a public address microphone.

2. The method of sending a presentation management predetermined message of claim 1 wherein said attaching a vibrator to a public address microphone further comprises containing a vibrator within a microphone.

3. The method of sending a presentation management predetermined message of claim 1 wherein said attaching a vibrator to a public address microphone further comprises attaching a vibrator to a clip holding a microphone.

4. The method of sending a presentation management predetermined message of claim 1, wherein said attaching a vibrator to a public address microphone further comprises attaching a vibrator to a wireless-microphone sending unit.

5. A device for sending an inconspicuous presentation management predetermined message to a presenter in front of an audience comprising;

means for said presenter to be observed by said audience;

means for a director, moderator, other such presentation manager, or presentation manager's representative to observe said presenter;

means for tactile contact of said presenter by said director, moderator, other such presentation manager, or presentation manager's representative;

means for actuation of said tactile contact from a measurable distance;

means for hiding, masking, or making invisible said tactile contact from said audience wherein said means for tactile contact is within or attached to a microphone or wireless-microphone sending unit; and means to attach said microphone or wireless-microphone sending unit to said presenter.

6. Means for tactile contact in claim 5 further comprising means to attach said microphone or wireless-microphone sending unit to epidermis.

7. Means for tactile contact in claim 5 further comprising means to attach said microphone or wireless-microphone sending unit to an item of personal clothing.

8. Means for tactile contact in claim 5 further comprising means to insert or attach said microphone or wireless microphone-sending unit to an item worn by said presenter.

9. Means for tactile contact in claim 5 further comprising means to insert or attach said microphone or wireless-microphone sending unit to an object held in said presenter's hand.

10. Means for tactile contact in claim 5 further comprising means to insert or attach said microphone or wireless-microphone sending unit to a wire attached or in close proximity to said presenter.

11. Means for tactile contact in claim 5 further comprising means to insert or attach said microphone or wireless-microphone sending unit to an item of jewelry.

12. A remote controlled device for vibrations in a public address microphone used before an audience comprising:

means to create mechanical movement of a sustained or varied frequency;

means to locate said mechanical movement on, within, or in close proximity to said public address microphone, or on or in close proximity to a person holding or wearing said public address microphone;

and means to activate said mechanical movement from a measurable distance.

13. The means to activate in claim 12 comprising a preset timer located on or near said means to create mechanical movement.

14. The means to activate in claim 12 further comprising:

means to generate an electronic, digital, or radio frequency signal;

means to transmit said signal;

means to receive said signal; and means to switch on or off said mechanical movement as a result of said signal.

15. The means to activate in claim 12 further comprising a hand held means.

* * * * *